(12) United States Patent
McGoldrick et al.

(10) Patent No.: US 10,023,142 B2
(45) Date of Patent: Jul. 17, 2018

(54) OPERATOR PRESENCE SYSTEM

(71) Applicants: Kevin J. McGoldrick, Greenville, NC (US); William Eugene James, Greenville, NC (US); Robert Stephen Adcox, Battleboro, NC (US); Christopher J. Goodwin, Greenville, NC (US); Matthew Wavrek, Baraboo, WI (US); Ken Schreiber, Greenville, NC (US)

(72) Inventors: Kevin J. McGoldrick, Greenville, NC (US); William Eugene James, Greenville, NC (US); Robert Stephen Adcox, Battleboro, NC (US); Christopher J. Goodwin, Greenville, NC (US); Matthew Wavrek, Baraboo, WI (US); Ken Schreiber, Greenville, NC (US)

(73) Assignee: HYSTER-YALE GROUP, INC., Fairview, OR (US)

( * ) Notice: Subject to any disclaimer, the term of this patent is extended or adjusted under 35 U.S.C. 154(b) by 122 days.

(21) Appl. No.: 15/004,758

(22) Filed: Jan. 22, 2016

(65) Prior Publication Data
US 2016/0214556 A1    Jul. 28, 2016

Related U.S. Application Data

(60) Provisional application No. 62/108,394, filed on Jan. 27, 2015.

(51) Int. Cl.
*B60R 21/015* (2006.01)
*B60K 28/04* (2006.01)
(Continued)

(52) U.S. Cl.
CPC ........ *B60R 21/01516* (2014.10); *B60K 28/04* (2013.01); *B66F 9/0759* (2013.01);
(Continued)

(58) Field of Classification Search
CPC .......... B60Q 1/00; B60K 28/00; B60K 26/00; B66F 9/06; B60R 212/015
See application file for complete search history.

(56) References Cited

U.S. PATENT DOCUMENTS 4,840,248 A    6/1989  Silverman
5,835,008 A   11/1998  Colemere, Jr.
(Continued)

OTHER PUBLICATIONS

EPO Search Report.

*Primary Examiner* — Yonel Beaulieu
*Assistant Examiner* — Martin A Weeks
(74) *Attorney, Agent, or Firm* — Schwabe Williamson & Wyatt (57) ABSTRACT

A vehicle equipped with an operator presence detector comprises an optional first detector located and configured to detect an object positioned over a threshold to the operator compartment; a second detector located and configured to detect an operator's left lower extremity when the left lower extremity is located in the operator compartment; and a third detector located and configured to detect an operator's right lower extremity when the right lower extremity is located in the operator compartment. The second detector and the third detector are positioned such that (i) an operator cannot use the left lower extremity to trigger both the second detector and the third detector and (ii) an operator cannot use the right lower extremity to trigger both the second detector and the third detector.

28 Claims, 10 Drawing Sheets

(51) Int. Cl.
*B66F 17/00* (2006.01)
*B66F 9/075* (2006.01)
*B60W 40/08* (2012.01)

(52) U.S. Cl.
CPC ... *B66F 17/003* (2013.01); *B60W 2040/0881* (2013.01); *B60W 2300/121* (2013.01); *B60W 2420/40* (2013.01); *B60Y 2200/15* (2013.01)

(56) References Cited

U.S. PATENT DOCUMENTS

| | | | |
|---|---|---|---|
| 6,137,398 A | 10/2000 | Dunlap et al. | |
| 6,974,948 B1 * | 12/2005 | Brent | B65F 1/1638 250/221 |
| 7,259,662 B2 * | 8/2007 | Lewis | B66F 17/003 340/439 |
| 8,485,301 B2 | 7/2013 | Grubaugh et al. | |
| 8,924,039 B2 | 12/2014 | Miller, IV et al. | |
| 2005/0270147 A1 | 12/2005 | Lewis | |
| 2007/0074923 A1 | 4/2007 | Billger et al. | |

* cited by examiner

OPERATOR PRESENCE SYSTEM

RELATED APPLICATIONS

This application claims priority to U.S. Patent Application No. 62/108,394 titled "Operator Presence System" and filed on 27 Jan. 2015, which is fully incorporated herein by reference.

TECHNICAL FIELD

The disclosure pertains to detecting a vehicle operator's presence and enabling, disabling, or not enabling one or more vehicle functions based on such detection, for example, to reinforce operator training.

BACKGROUND

Operators stand when driving certain types of industrial vehicles, such as one or more models of end-rider lift trucks, reach trucks, straddle trucks, standup end control trucks, center rider trucks, tugger trucks and order picker trucks. By federal law, the operators of such industrial vehicles are required to have rigorous training, certification and recertification by their employers. Such training includes instruction that the operator maintain both feet and both legs within the operator's compartment during use. Hereinafter, the combination of a leg and its attached foot is referred to as a "lower extremity." Various systems and methods have been developed to reinforce such operator training while an industrial vehicle is in use.

SUMMARY

Disclosed systems and methods detect when an operator is or is not standing properly in an operator's compartment, preferably in a manner consistent with the driver's training. In preferred embodiments, the entire vehicle, or one or more functions of the vehicle, may be enabled, limited, or disabled depending on whether an operator's position on a driving platform is consistent with the training received by the operator. For example, a drive function of an end-rider lift truck may be disabled when a detection device or system associated with such a vehicle detects there is no operator on the drive platform or a driver on the drive platform is not standing with both feet in a predetermined configuration; or multiple functions may be disabled, such as a drive function and a hoist function.

According to one embodiment, a vehicle equipped with an operator presence detector comprises a first detector or first collection of detectors located and configured to detect an object positioned over or in the threshold plane to the operator compartment; a second detector or second collection of detectors located and configured to detect an operator's left lower extremity when the left lower extremity is located in the operator compartment; and a third detector or third collection of detectors located and configured to detect an operator's right lower extremity when the right lower extremity is located in the operator compartment. The second detector, or second detector collection, and the third detector, or third detector collection, are positioned such that an operator cannot cause the second detector, or second detector collection, to detect both a left lower extremity and a right lower extremity at the same time and cannot cause the third detector, or third detector collection, to detect both a right lower extremity and a left lower extremity at the same time.

DETAILED DESCRIPTION

The following description of the illustrated embodiments provides non-limiting examples of how the invention may be practiced. It is understood that other embodiments may be utilized and that changes may be made without departing from the spirit and scope of the invention, which is defined solely by the claims.

The present inventors have recognized that operators of industrial vehicles equipped with a standing operator compartment commonly utilize a five-point stance, for example, both feet on the floor of an operator compartment, one hand on a steering device, one hand on an interior portion of the operator compartment, and a portion of the back pressed against an interior portion of the operator compartment, which enables them to perform operating tasks in a safe, stable and secure manner, while keeping all body parts within the operator's compartment of the truck at all times during all aspects of truck operation.

An operator compartment comprises a designated place on a vehicle for an operator to stand. For example, an operator compartment may be partially enclosed in some embodiments while in other embodiments an operator compartment may comprise an unenclosed platform. Embodiments described herein, as well as other embodiments, enhance the ergonomics of the stand-drive truck design, and of other suitable vehicles, by increasing the operator's flexibility and comfort throughout the course of a full-day shift and at the same time reinforcing the operator's training and understanding of the need to keep all body parts, including both lower extremities, within the operator's compartment at all times during operation, for example, by enhancing an operator's ability to reposition either foot within an operator compartment while activating the operator presence detector in a manner that enables one or more vehicle functions.

Figure 1:
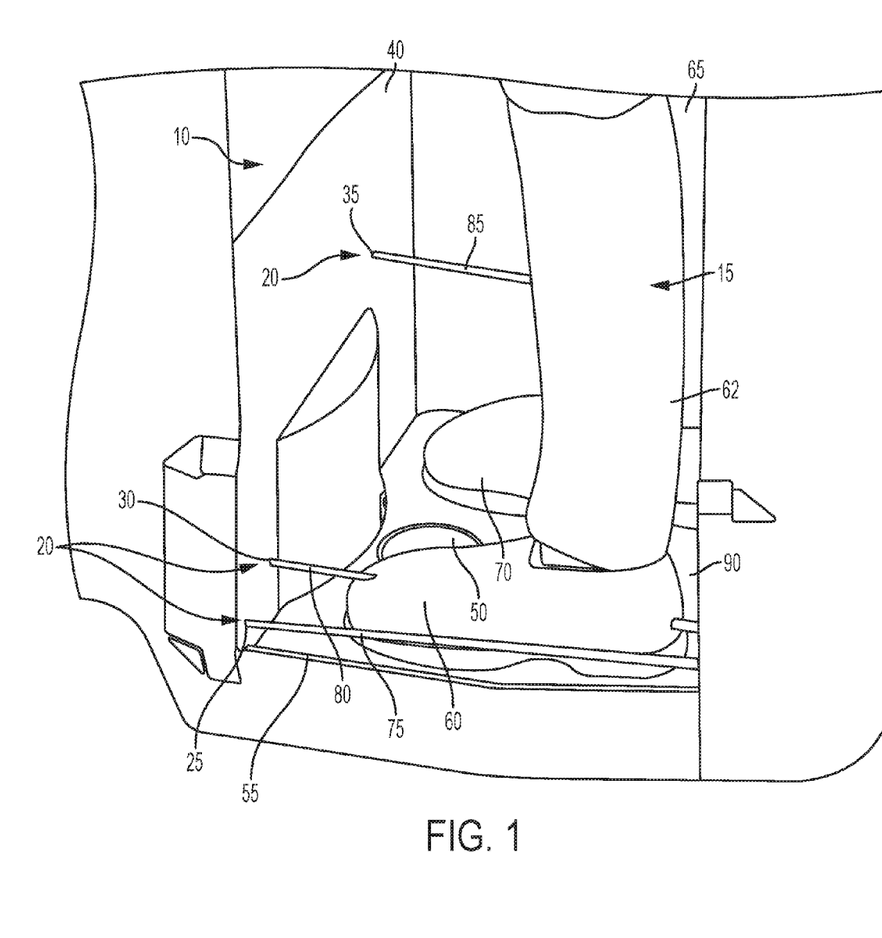
FIG. 1 is a rear orthogonal view of an exemplary industrial vehicle equipped with an operator presence detector with an operator in the operator compartment.
Figure 2:
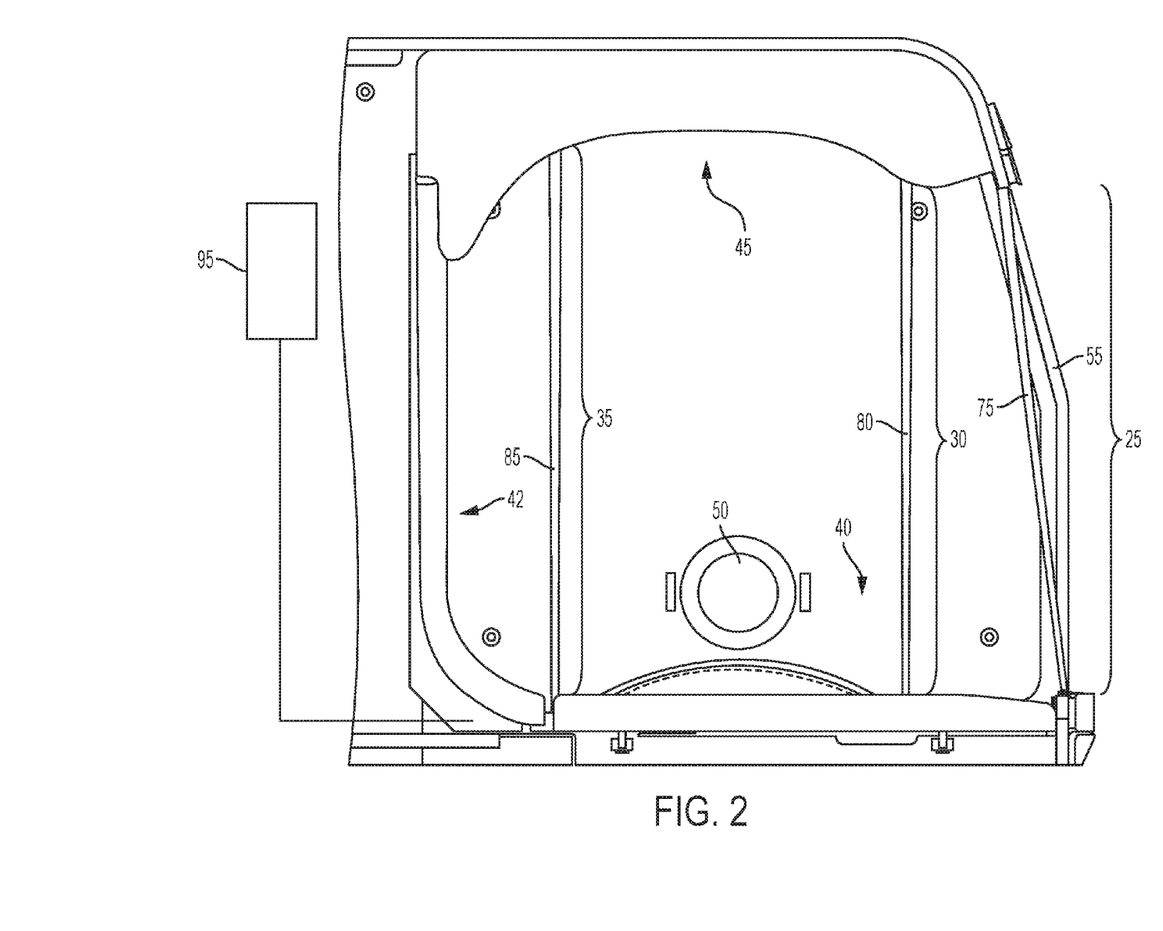
FIG. 2 is a top view of the industrial vehicle of FIG. 1 without an operator in the operator compartment.

An exemplary embodiment comprising a vehicle 5, which may be an enclosed end-rider lift truck or other suitable vehicle, an operator compartment 10 configured for an operator 15 to stand in using a side-stance and an operator presence detector 20 is described making reference to FIGS. 1 and 2. In the illustrated embodiment, the operator presence detector 20 comprises a first detector 25, a second detector 30, and a third detector 35. In some embodiments, the first detector 25 is optional. In other embodiments, the first detector 25 comprises multiple detectors arranged extending vertically above the threshold 55. Each of the first detector 25, the second detector 30, and the third detector 35 comprise an optical emitter and receiver where one of the emitter and receiver is located at a left side 40 and the other of the emitter and receiver is located at a right side 45 (FIG. 2) of the operator compartment 10. It is not important which side, left side 40 or right side 45, bears the emitter or the receiver for each of the detectors 25, 30, and 35. References to sides of an operator compartment are understood to be references to sides of a floor of an operator compartment, such as floor 90, as well, regardless of whether an operator compartment lacks one or more sidewalls. An object that prevents radiation sent from the emitter of the first detector 25, the second detector 30, or the third detector 35 from being received at the receiver causes the first detector 25, the second detector 30, or the third detector 35 to detect the object. In other embodiments a retro-reflective type sensor may be used with a reflective material located proximate one of the sides 40 or 45 opposite the side 40 or 45 where a combined emitter and receiver is located. Ultrasonic, photoelectric (opposed, retro-reflective, or proximity-sensing), acoustic, proximity, or radar, or other suitable detectors, may be used.

The brake 50 may not be configured to operate as part of the operator presence detector 20, but functions as a brake pedal that may be activated by the operator 15 to provide variable amounts of braking. In other words, brake 50 does not need to be configured as a dead-man switch. In some embodiments, the brake is used in the logic sequence for initial start and static return to off (SRO) restart events to confirm brake switch function before vehicle functions are enabled.

The detectors 25, 30, and 35 preferably communicate with a processor located on the vehicle 5 (schematically illustrated as 95 in FIG. 2) that determines whether an object is detected by one or more of the detectors 25, 30, and 35 and controls one or more functions of vehicle 5. In other embodiments, the detectors 25, 30, and 35 may be configured to generate an analogue or other suitable signal that is used to control one or more functions of vehicle 5 without a processor 95. In the embodiment illustrated in FIGS. 1 and 2, one or more detectors 25 are positioned and configured to detect an object located above or that passes over the threshold 55, for example, an object intersecting the vertical, curved face extending above the threshold 55, of the operator compartment 10. Detector 30 is positioned above floor 90 and is configured to detect a left lower extremity, for example, foot 60, leg 62, or both, of operator 15. Detector 35 is positioned above floor 90 and is configured to detect a right lower extremity, for example, leg 65, foot 70, or both, of operator 15. In some embodiments, detector 30 is positioned and configured to detect a left lower extremity (62 and 60) preferably at or above the toes and below the hip, and more preferably above the toes and below the ankle, of operator 15. In some embodiments, detector 35 is positioned and configured to detect a right lower extremity (65 and 70) preferably at or above the toes and below the hip, and more preferably above the ankle and below the knee, of operator 15.

The second detector 30 and the third detector 35 are positioned and arranged such that the operator 15 cannot cause both the second detector 30 and the third detector 35 to detect an object using one lower extremity, such as leg 65 and its connected foot 70, or leg 62 and its connected foot 60. In other words, the operator 15 must use one lower extremity to cause one of the second detector 30 and the third detector 35 to detect an object and the other lower extremity to cause the other of the second detector 30 and the third detector 35 to detect an object.

In the embodiment illustrated in FIG. 1, the second detector 30 is located towards the rear of the operator compartment 10 and is proximate the threshold 55 of the operator compartment 10. The third detector 35 is located towards the front operator compartment 10 and is proximate the front side 42 of the operator compartment 10 such that the second detector 30 and the third detector 35 are horizontally spaced apart (FIG. 2), preferably no less than 150 millimeters (mm), and more preferably in a range of 275 mm to 285 mm. Other suitable distances may be used based on operator compartment configuration, anticipated operator size, or other suitable factors affecting whether an operator is able to trigger a second detector, such as detector 30, and a third detector, such as detector 35, with a single lower extremity. While the second detector 30 and the third detector 35 are illustrated as emitting a detection field from the left side 40 towards the right side 45 of the operator compartment 10, the direction in which a detection field is propagated is not important and one or both of the second detector 30 and the third detector 35 may emit in the reverse direction.

Figure 3:
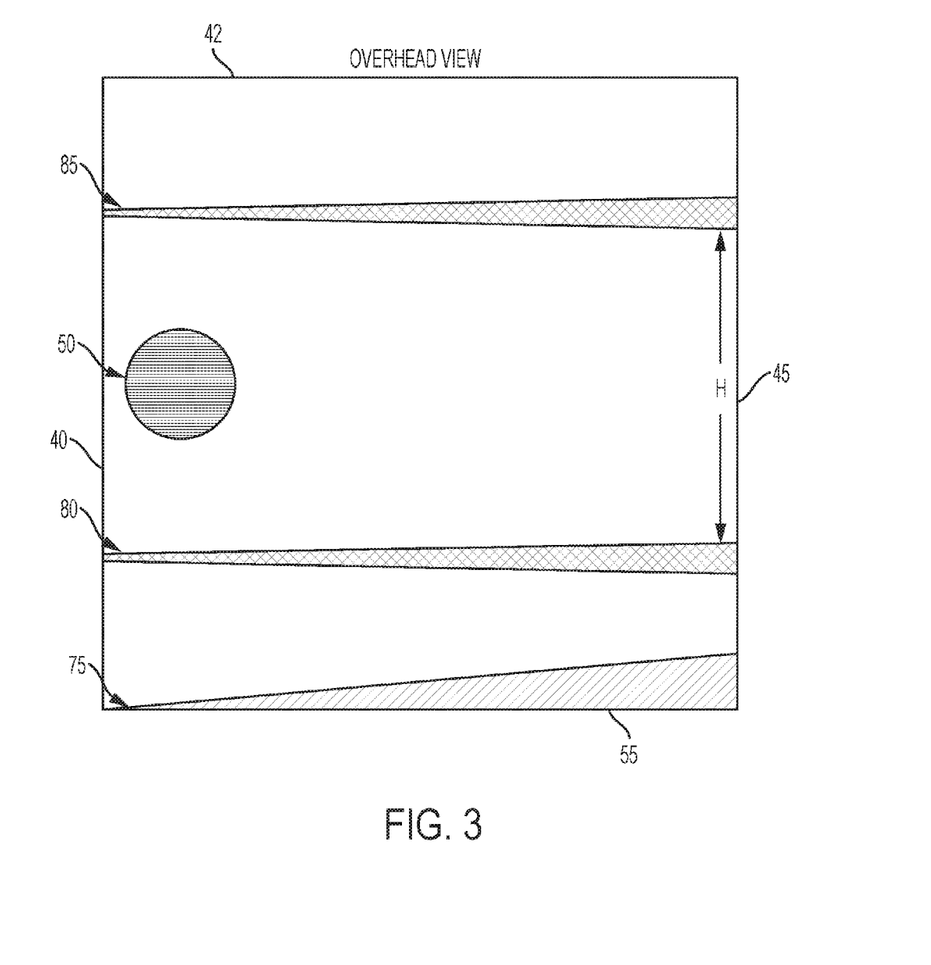
FIG. 3 is a schematic top view of the industrial vehicle of FIG. 1 illustrating relative horizontal displacement of detection fields associated with three detectors. Although not illustrated, detection fields may propagate in the same direction or alternate directions from either side of the compartment.
Figure 5:
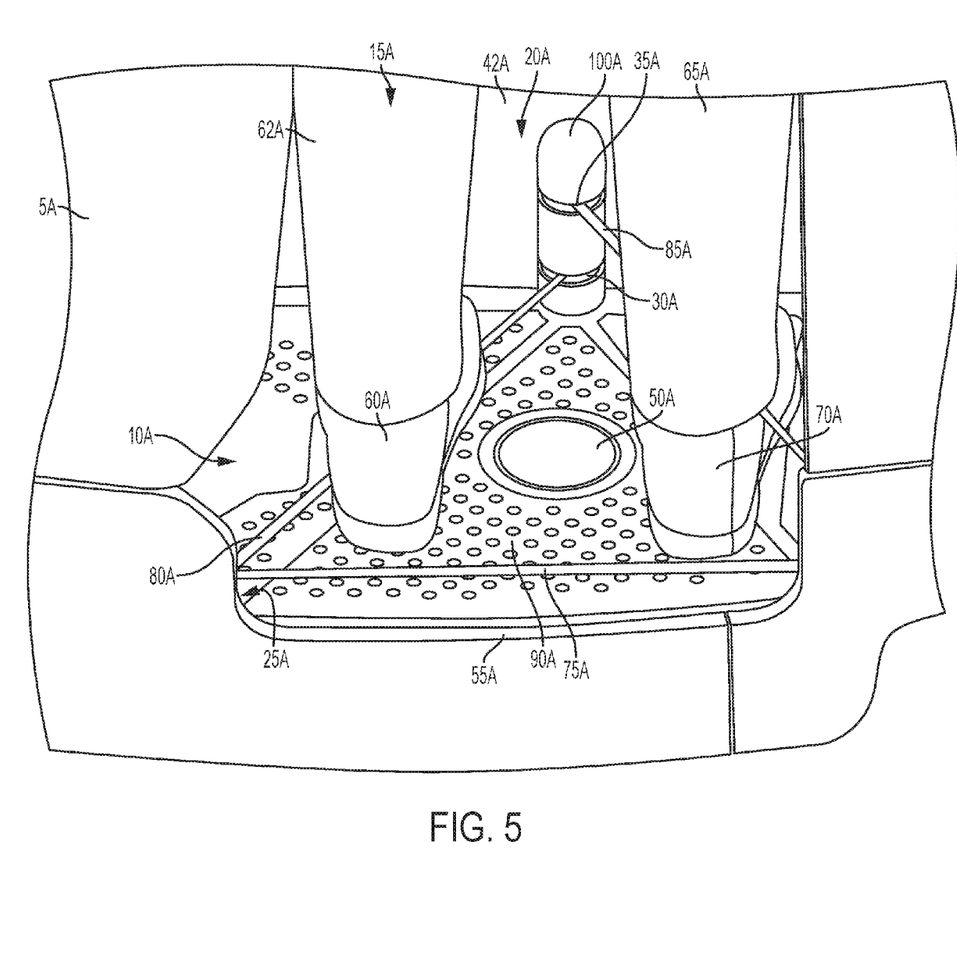
FIG. 5 is a rear view looking down at another exemplary industrial vehicle equipped with an operator presence detector with an operator in the operator compartment.
Figure 6:
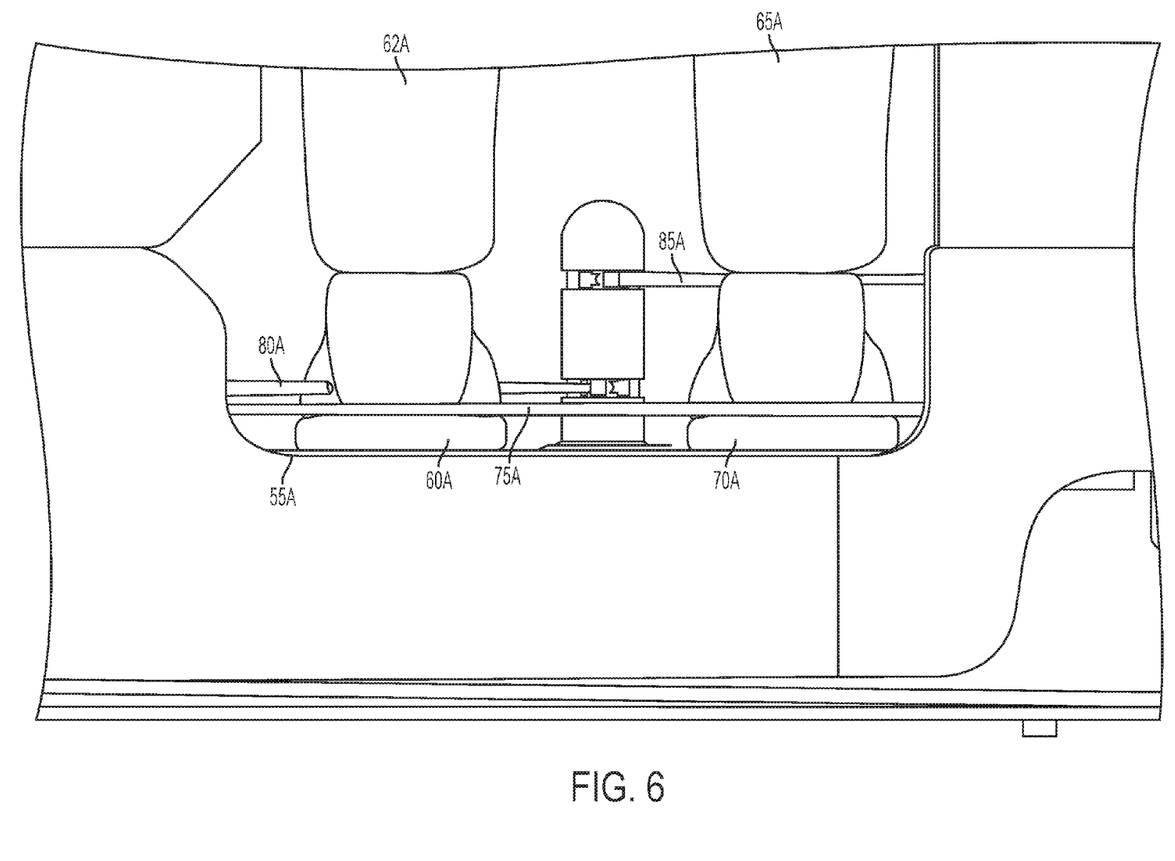
FIG. 6 is a rear view of the industrial vehicle of FIG. 5 with an operator in the operator compartment.

A detection field is a volume within which a detector detects the presence of an object when at least a portion of an object is located within at least a portion of the volume. For example, for a photoelectric sensor that sends and receives a radiation beam, such as radiation 75, 80 and 85, the volume occupied by the radiation beam comprises the detection field for a detector. As schematically illustrated in FIG. 3, radiation 75, 80 and 85 are conically shaped and have a cross-sectional area proximate the left side 40 of the operator compartment that is smaller than the cross-sectional area proximate the threshold 55. Other suitable detectors may have different detection fields. For illustrative purposes, radiation is illustrated in FIGS. 1, 5, and 6 as extending through a lower extremity to show the radiation path, however, in actuality such lower extremity blocks radiation and radiation only exists on one side of a lower extremity when a lower extremity is detected by a detector.

Optionally, the boundaries of detection fields, such as radiation 80 and 85, or other suitable signal or source, associated with the second detector 30, and the third detector 35, respectively, come no closer than a closest horizontal distance H (FIG. 3) that is no less than 150 mm, and preferably in a range of 275 mm to 285 mm. In other embodiments, other suitable distances may be used.

In other embodiments, the detection field from the second detector 30 diverges from the detection field of the third detector in a horizontal direction, a vertical direction, or both, as distance increases away from the left side 40. For example, the horizontal distance between the boundary of the detection field associated with the second detector 30 that is closest to a boundary of the detection field associated with the third detector 35 may be 270 mm proximate the left side 40 and the horizontal distance between the boundary of the detection field associated with the second detector 30 that is closest to a boundary of the detection field associated with the third detector 35 may be 290 mm proximate the right side 45. As an example of vertical convergence, the vertical distance between the boundary of the detection field associated with the second detector 30 that is closest to a boundary of the detection field associated with the third detector 35 may be 165 mm proximate the left side 40 and the vertical distance between the boundary of the detection field associated with the second detector 30 that is closest to a boundary of the detection field associated with the third detector 35 may be 155 mm proximate the right side 45.

In yet other embodiments the detection field of the second detector 30 converges with respect to the detection field of the third detector 35 as distance increases away from the left side 40. For example, the horizontal distance between the boundary of the detection field associated with the second detector 30 that is closest to a boundary of the detection field associated with the third detector 35 may be 290 mm proximate the left side 40 and the horizontal distance between the boundary of the detection field associated with the second detector 30 that is closest to a boundary of the detection field associated with the third detector 35 may be 270 mm proximate the right side 45. As another example, the vertical distance between the boundary of the detection field associated with the second detector 30 that is closest to a boundary of the detection field associated with the third detector 35 may be 145 mm proximate the left side 40 and the vertical distance between the boundary of the detection field associated with the second detector 30 that is closest to a boundary of the detection field associated with the third detector 35 may be 165 mm proximate the right side 45.

Figure 4A:
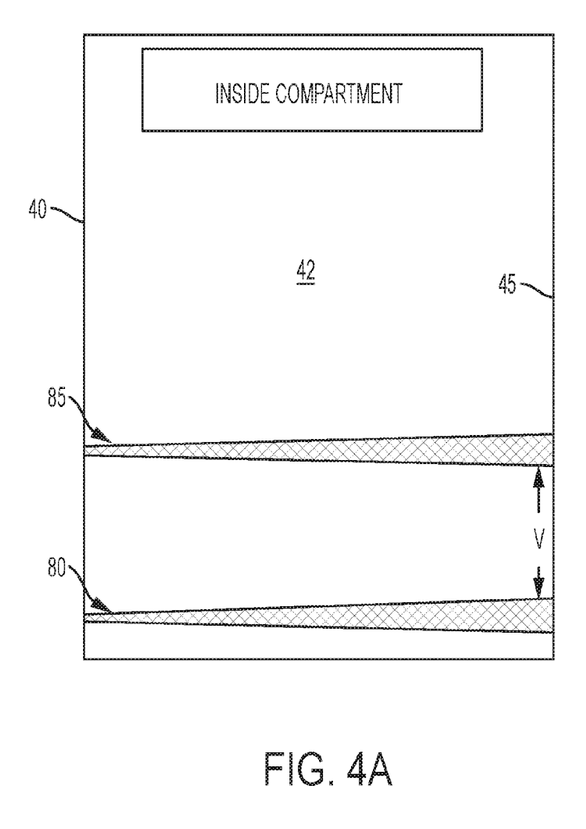
FIG. 4a is a rear schematic view of the industrial vehicle of FIG. 1 illustrating relative vertical displacement of detection fields associated with two detectors.
Figure 4B:
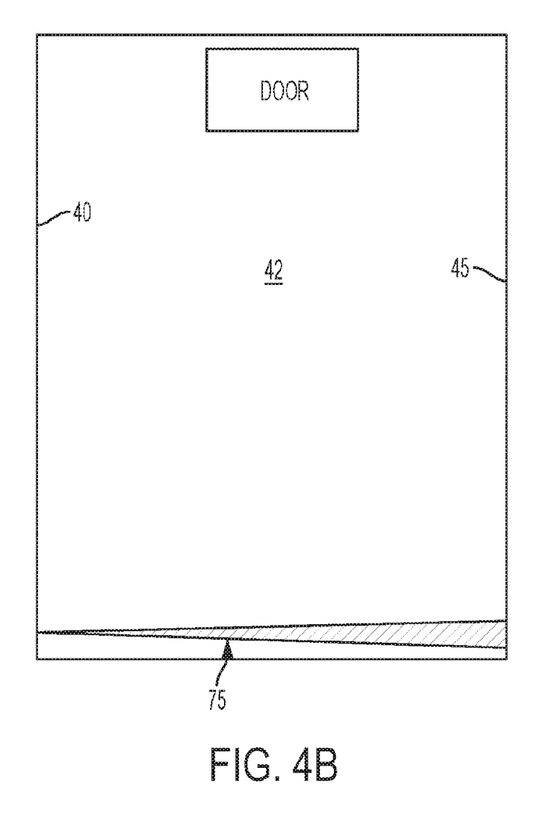
FIG. 4b is a rear schematic view of the industrial vehicle of FIG. 1 illustrating relative vertical location of a detection field associated with one detector.

In the embodiment illustrated in FIGS. 1 and 2, the second detector 30 is located a distance above the floor 90 of the operator compartment 10 in a range of 10 mm to 800 mm, and preferably 25 mm to 35 mm. The third detector 35 is located a distance above the floor 90 of the operator compartment 10 in a range of 10 mm to 800 mm, and preferably 180 mm to 190 mm. Optionally, the second detector 30 and the third detector 35 are vertically spaced apart in a range of 50 mm to 800 mm, and preferably of 145 mm to 165 mm. Optionally, the boundaries of detection fields, such as radiation 80 and 85, or other suitable signal or source, associated with the second detector 30 and the third detector 35, respectively, come no closer than a closest vertical distance V (FIG. 4a) that is in a range of 50 mm to 800 mm, and preferably 145 mm to 165 mm. In other embodiments, other distances may be used. In yet other embodiments, the detection field associated with the second detector 30 and the detection field associated with the third detector 35 may diverge or converge with respect to each other vertically as distance increases away from the left side 40. In yet other embodiments, the detection field associated with the second detector 30 and the detection field associated with the third detector 35 may diverge or converge with respect to each other horizontally as distance increases away from the left side 40. In other embodiments, the second detector 30 remains proximate the threshold 55 of the operator compartment 10, but is located above floor 90 in a range of 10 mm to 800 mm, and preferably 180 mm to 190 mm, and the third detector 35 remains proximate the front side 42 of the operator compartment 10, but is located above floor 90 in a range of 10 mm to 800 mm, and preferably 25 mm to 35 mm.

By suitably horizontally and/or vertically separating (i) the second detector 30 and the third detector 35, (ii) the detection field associated with the second detector 30 and the detection field associated with third detector 35, or (iii) both (i) and (ii), the operator presence detector 20 is configured such that an operator 15 cannot cause both the second detector 30 and the third detector 35 to detect an object using one lower extremity. Because the target, an operator's left lower extremity (60 and 62) or right lower extremity (65 and 70), is relatively large, an operator may shift positions of either or both feet without deactivating the operator presence detector 20. Thus, an operator 15 is not necessarily required to maintain contact between one or both feet and the compartment floor 90 to trigger the second detector 30 or the third detector 35, unlike a conventional dead-man switch, and may obtain a changed position to relieve stress or fatigue or to become more comfortable without deactivating the operator presence detector 20. In other embodiments, the second detector 30, the third detector 35, or both, may comprise more than one detector, for example, 2, 3, or more detectors may be used to detect an operator's lower left extremity and 2, 3, or more detectors may be used to detect an operator's lower right extremity such that there is vertical spacing, horizontal spacing, or both, between each of the plurality of detectors comprising the second detector 30, the third detector 35, or both.

In the embodiment illustrated in FIG. 1 the first detector 25 is located proximate to the threshold 55 of the operator compartment 10, and is preferably to the rear (horizontally) of the second detector 30, such that the second detector 30 is located between the first detector 25 and the third detector 35. The first detector 25 emits radiation 75, or other suitable signal or source, to detect an object that is above the threshold 55 and is preferably placed sufficiently close to the threshold 55 to detect any portion of an operator that intersects the vertical, curved face extending above the threshold 55. In the illustrated embodiment, the first detector 25 is in a range of 15 mm to 35 mm above the floor 90, preferably in a range of 25 mm to 30 mm. In other embodiments, the first detector 25 may comprise more than one detector, for example 2, 3, or more detectors may be located above the threshold 55 such that there is vertical spacing between each of the detectors and each of the detectors are arranged proximate the vertical, curved face extending above the threshold 55. In one embodiment, the first detector 25 comprises multiple detectors where the detectors span between the floor 90 and a top of an operator compartment (FIG. 2).

Figure 7:
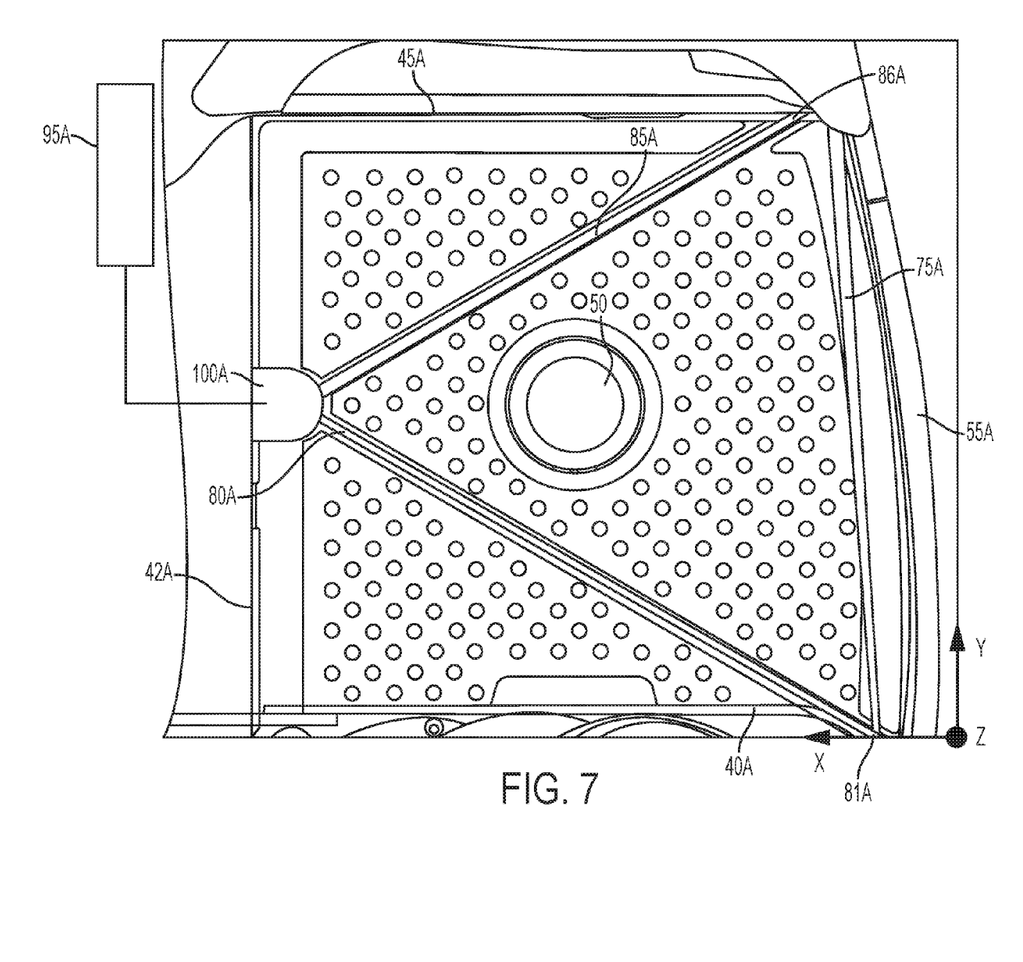
FIG. 7 is a top view of the industrial vehicle of FIG. 5 without an operator in the operator compartment.
Figure 9A:
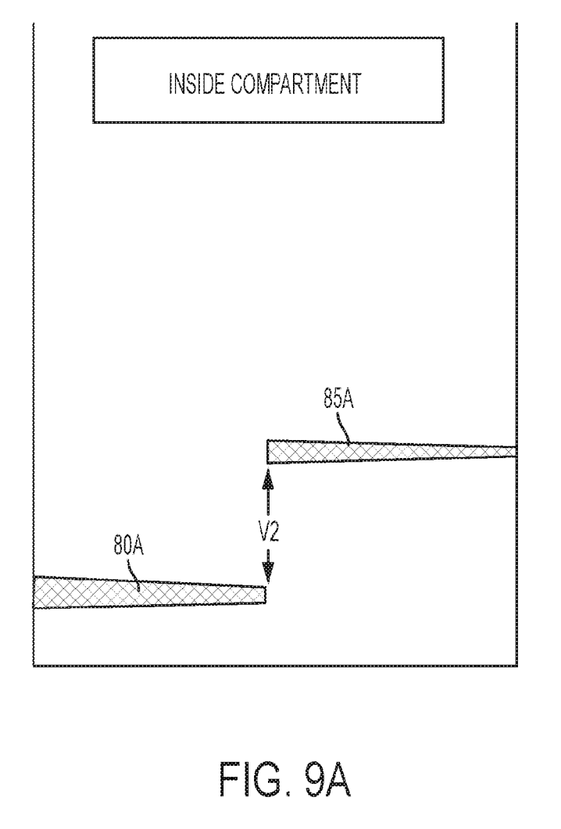
FIG. 9a is a rear schematic view of the industrial vehicle of FIG. 5 illustrating relative vertical displacement of detection fields associated with two detectors.
Figure 9B:
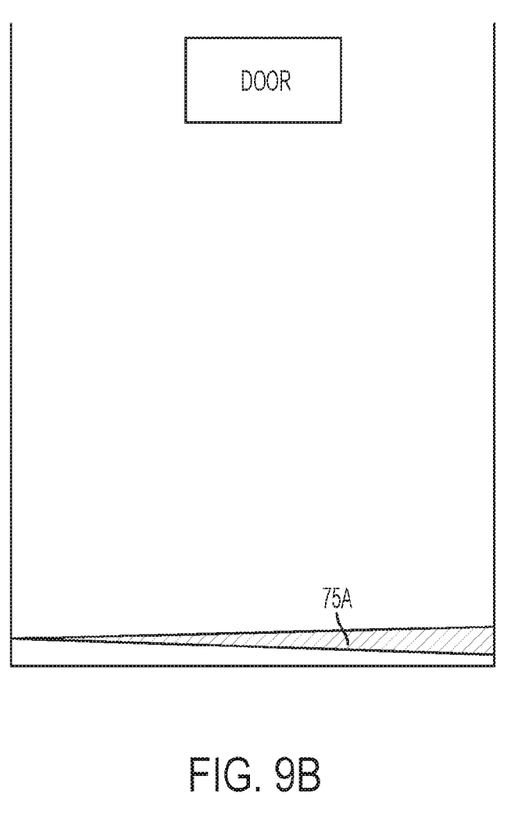
FIG. 9b is a rear schematic view of the industrial vehicle of FIG. 5 illustrating relative vertical location of a detection field associated with one detector.

In the embodiment illustrated in FIGS. 5, 6, and 7, an operator presence detector 20A configured for an operator 15A using a fore/aft stance is illustrated. A portion of the second detector 30A is located near a front side 42A of the operator compartment 10A and a portion of the third detector 35A is also located near the front side 42A of the operator compartment 10A such that the second detector 30A and the third detector 35A have portions that are vertically aligned, in other words, stacked with one portion above the other, and are optionally vertically spaced apart in a range of 0 mm to 800 mm, and preferably of 10 mm to 50 mm. Optionally, an upper boundary of the detection field associated with the second detector 30A, such as radiation 80A, and a lower boundary of the detection field associated with the third detector 35A, such as radiation 85A, remain separated by a closest vertical distance V2 (FIG. 9a), that is in a range of 0 mm to 800 mm, and preferably 10 mm to 50 mm. In other embodiments, other distances may be used.

Figure 8:
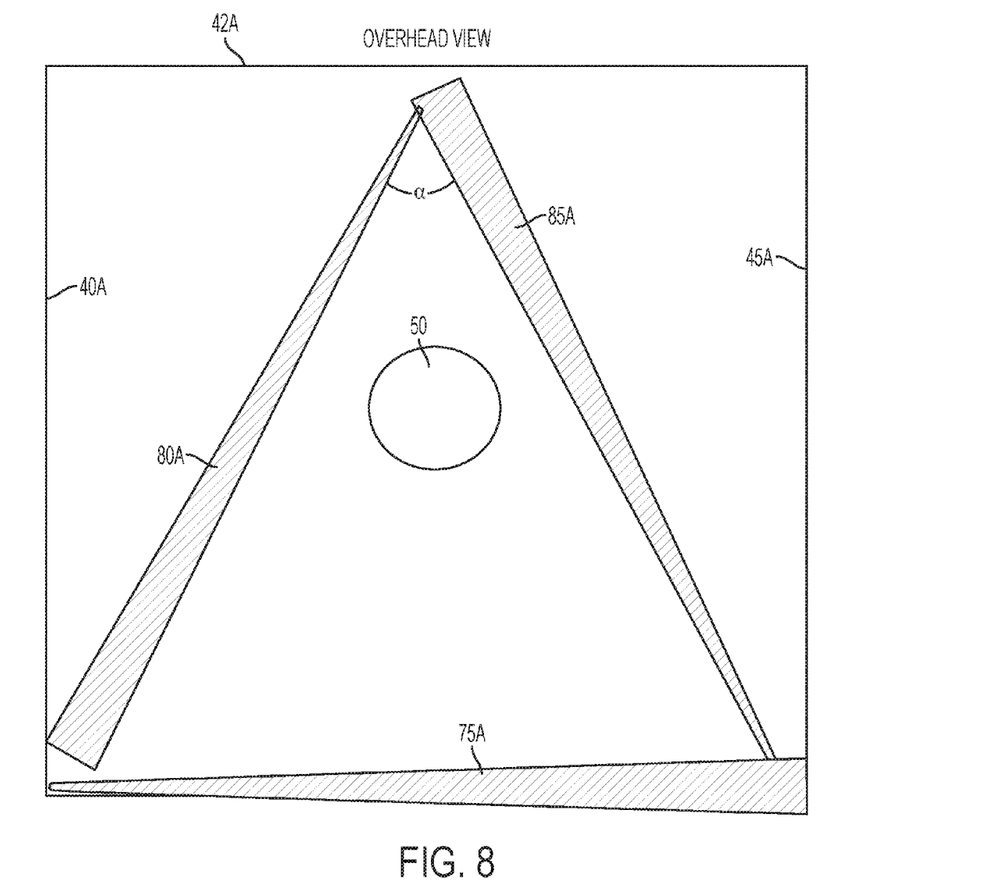
FIG. 8 is a schematic top view of the industrial vehicle of FIG. 5 illustrating relative horizontal displacement of detection fields associated with three detectors. Although not illustrated, detection fields may propagate in the same direction or alternate directions from either side of the compartment.

Optionally, the detection field, such as radiation 80A, or other suitable signal or source, associated with the second detector 30A, and the detection field, such as radiation 85A, or other suitable signal or source, associated with the third detector 35A, respectively, are vertically aligned with each other proximate the front side 42A and diverge from each other in a direction extending from the front side 42A toward the threshold 55A. For example, as illustrated in FIG. 7, the second detector 30A and the third detector 35A may be vertically aligned by including a portion of each detector in post 100A. An example of diverging detection fields is illustrated by radiation 80A originating from the second detector 30A located in post 100A and being received by an optical detector 81A located on the left side 40A of the operator compartment 10A while radiation 85A originates from third detector 35A located in post 100A and is directed to an optical detector 86A located on the right side 45A of the operator compartment 10A. In some embodiments, a greater detection field divergence may be created by locating optical detectors 81A and 86A, or other suitable detector components, closer to the front side 42A of the operator compartment 10A. In other embodiments, a lesser detection field divergence may be created by horizontally offsetting the portion of the second detector 30A and the portion of the third detector 35A on either side of the center of front side 42A, for example, by locating the portion of the second detector 30A closer to the left side 40A and by locating the portion of the third detector 35A closer to the right side 45A. Optionally, second detector 30A and the third detector 35A portions may be horizontally spaced apart no less than 150 mm, and preferably in a range of 270 mm to 290 mm. Optionally, the angle α (FIG. 8) between detection fields, such as radiation 80A and 85A, or other suitable detection field associated with the second detector 30A, and the third detector 35A, respectively, is no less than 60 degrees, and is preferably 60 degrees to 70 degrees. In the embodiment illustrated in FIG. 8, the optical emitter for the second detector 30A and the optical receiver for the third detector 35A are located in post 100A, the optical receiver for the second detector 30A is located on the left side 40A and the emitter for the third detector 35A is located on the right side 45A. In other embodiments, other arrangements may be used, for example, both emitters or both receivers may be located in the post 100A, or components of the second detector 30A and the third detector 35A may be located in or on the front side 42A.

In the embodiment illustrated in FIGS. 5-7, the second detector 30A is located a distance above the floor 90A of the operator compartment 10A in a range of 10 mm to 800 mm, and preferably 10 mm to 50 mm. The third detector 35A is located a distance above the floor 90A of the operator compartment 10A in a range of 10 mm to 800 mm, and preferably 20 mm to 100 mm. Thus, the second detector 30A and the third detector 35A may be located at the same, or approximately the same, vertical height above floor 90A, or the second detector 30A and the third detector 35A may be vertically spaced apart in a range of 0 mm to 800 mm, and preferably of 10 mm to 50 mm. In yet other embodiments, the detection field associated with the second detector 30A and the third detector 35A may diverge or converge with respect to each other horizontally, vertically, or both, as distance increases away from the front side 42A.

By suitably horizontally and/or vertically separating (i) the second detector 30A and the third detector 35A, (ii) the detection field associated with the second detector 30A and the detection field associated with the third detector 35A, or (iii) both (i) and (ii), the operator presence detector 20A is configured such that an operator 15A cannot cause both the second detector 30A and the third detector 35A to detect an object using one lower extremity. Because the target, an operator's left lower extremity (60A and 62A) or right lower extremity (65A and 70A), is relatively large, an operator may shift positions of either or both feet without deactivating the operator presence detector 20A. Thus, an operator 15A may obtain a changed position to relieve stress or fatigue or to become more comfortable without deactivating an operator presence detector that comprises the second detector 30A and the third detector 35A. In other embodiments, the second detector 30A, the third detector 35A, or both may comprise more than one detector, for example, 2, 3, or more detectors may be used to detect an operator's lower extremities such that there is vertical spacing, horizontal spacing, or both, between each of the plurality of detectors comprising the second detector 30A, the third detector 35A, or both.

In the embodiment illustrated in FIGS. 5, 6, and 7 the first detector 25A is located over or proximate to the threshold 55A of the operator compartment 10A, and is preferably constructed as described with respect to the first detector 25 (FIG. 1).

In one embodiment, when power is supplied to the detectors 25/25A, 30/30A, and 35/35A, each emits radiation 75/75A, 80/80A, and 85/85A, respectively, that is received by the corresponding receiver portion for detectors 25/25A, 30/30A, and 35/35A when no objects are between each emitter and receiver of detector 25/25A, 30/30A, and 35/35A (FIGS. 2 and 7). When both the second detector 30/30A and the third detector 35/35A do not detect an object (FIGS. 2 and 7), the processor 95/95A may be programmed to disable one or more functions of vehicle 5/5A, such as traction. When both the second detector 30/30A and the third detector 35/35A do detect an object (FIGS. 1 and 5), the processor 95/95A may be programmed to enable one or more functions of vehicle 5/5A. Optionally, when either the second detector 30/30A or the third detector 35/35A detects an object, but the other does not, the processor 95/95A is programmed to enable one or more functions of vehicle 5/5A, but in a limited capacity. For example, traction may be enabled, but limited to 10% of the vehicle's top speed. Optionally, for an industrial vehicle where an operator stands sideways with respect to the vehicle's forward and reverse directions, if a detector proximate a threshold to an operator compartment or the rear of the vehicle does not detect a lower extremity, one or more vehicle functions such as traction may be disabled. Optionally, for an industrial vehicle where an operator stands facing the vehicle's forward or reverse direction, if either detector associated with an operator compartment does not detect a lower extremity, one or more vehicle functions such as traction may be disabled. However, even if one or both the second detector 30/30A and the third detector 35/35A detect an object, the processor 95/95A may be programmed to disable one or more functions of vehicle 5/5A if the optional first detector 25/25A, when included, detects an object. The enabling, disabling, and limiting of vehicle functions correlating to states of object detection by the detectors 25/25A, 30/30A, and 35/35A may vary according to type of vehicle, vehicle operating environment, desired vehicle operation or other suitable factors.

Figure 10:
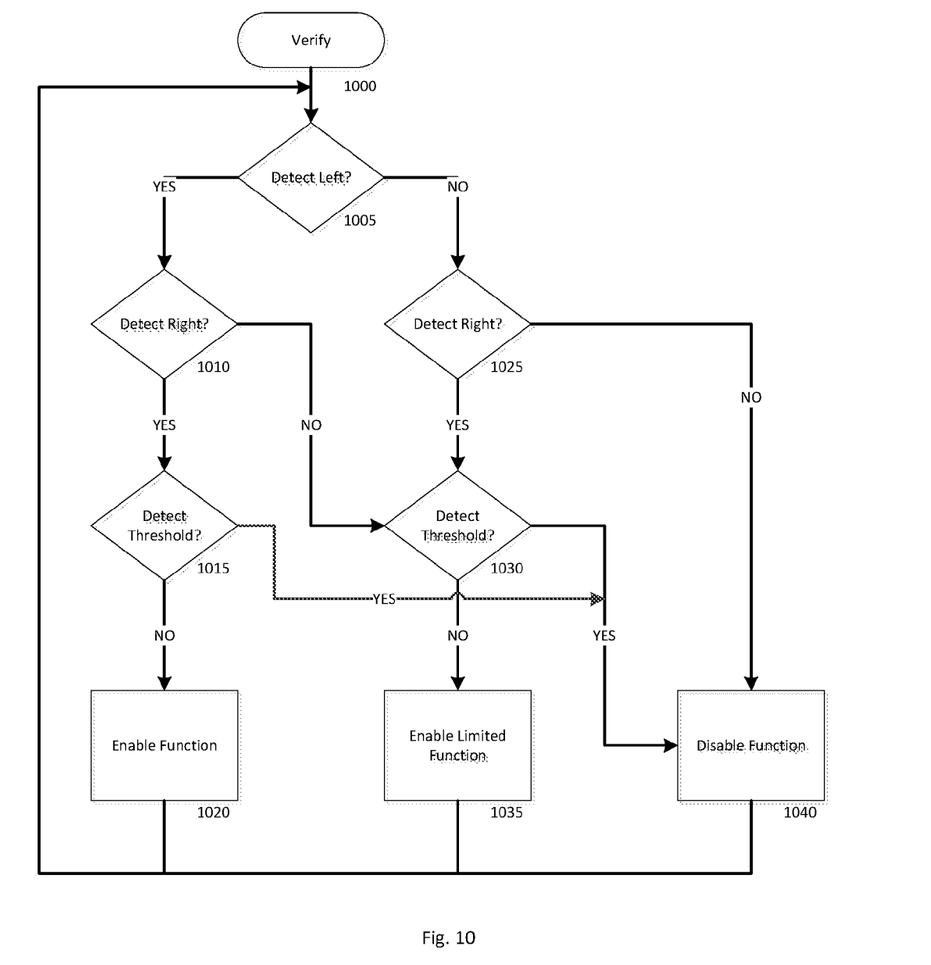
FIG. 10 is a flowchart of an exemplary method.

An exemplary method of operating an industrial vehicle 5/5A comprises verifying whether detectors 25/25A, 30/30A, and 35/35A are functioning at step 1000, for example, using processor 95/95A at vehicle 5/5A start-up. At step 1005, detecting whether an operator's left lower extremity (60/60A and 62/62A), or a portion thereof such as foot 60/60A, is present when the detected left lower extremity (60/60A and 62/62A) is located in the operator compartment 10/10A. The method also comprises, at step 1010, detecting whether an operator's right lower extremity (65/65A and 70/70A), or a portion thereof such as leg 65/65A, is present when the right lower extremity (65/65A and 70/70A) is also located in the operator compartment 10/10A. The method also comprises detecting whether an object is located over a threshold, such as threshold 55/55A, to the operator compartment 10/10A at step 1015. At step 1020, the method comprises enabling a vehicle function, such as traction, if (a) an operator left lower extremity (60/60A and 62/62A) is detected at step 1005, (b) an operator right lower extremity (65/65A and 70/70A) is detected at step 1010, and (c) no object located over the threshold 55/55A to the operator compartment 10/10A is detected at step 1015.

The exemplary method also includes disabling the vehicle function at step 1040 if an object located over the threshold 55/55A to the operator compartment 10/10A is detected at step 1015.

Additionally, the method includes limiting operation of the vehicle function at step 1035 if (a) an operator left lower extremity (60/60A and 62/62A) is not detected at step 1005, (b) an operator right lower extremity (65/65A and 70/70A) is detected at step 1025, and (c) no object located over the threshold 55/55A to the operator compartment 10/10A is detected at step 1030; or if (d) an operator left lower extremity (60/60A and 62/62A) is detected at step 1005, (e) an operator right lower extremity (65/65A and 70/70A) is not detected at step 1010, and (f) no object located over the threshold 55/55A to the operator compartment 10/10A is detected at step 1030. In other embodiments, depending on the operator stance or other suitable factor, when either an operator lower left extremity or an operator lower right extremity is not detected the vehicle function may be disabled instead of limited at step 1035.

The method also includes disabling operation of the vehicle function at step 1040 if (a) an operator left lower extremity (60/60A and 62/62A) is not detected at step 1005, and (b) an operator right lower extremity (65/65A and 70/70A) is not detected at step 1025, even if no object located over the threshold 55/55A to the operator compartment 10/10A is detected; or if an object is detected at step 1030.

Another exemplary method of operating an industrial vehicle 5/5A comprises verifying whether detectors 25/25A, 30/30A, and 35/35A are functioning at step 1000, for example, using processor 95/95A at vehicle 5/5A start-up. At step 1005, detecting that an operator's left lower extremity (60/60A and 62/62A), or a portion thereof such as foot 60/60A, is present when the detected left lower extremity (60/60A and 62/62A) is located in the operator compartment 10/10A. The method also comprises, at step 1010, detecting that an operator's right lower extremity (65/65A and 70/70A), or a portion thereof such as leg 65/65A, is present when the right lower extremity (65/65A and 70/70A) is also located in the operator compartment 10/10A, and skips directly to enabling a vehicle function, such as traction, at step 1020, without detecting whether an object is located over the threshold 55/55A to the operator compartment 10/10A at step 1015.

The other exemplary method also includes limiting operation of the vehicle function at step 1035 if (a) an operator left lower extremity (60/60A and 62/62A) is not detected at step 1005, and (b) an operator right lower extremity (65/65A and 70/70A) is detected at step 1025, and (c) omitting step 1030; or if (d) an operator left lower extremity (60/60A and 62/62A) is detected at step 1005, (e) an operator right lower extremity (65/65A and 70/70A) is not detected at step 1010, and (f) omitting step 1030.

Alternately, instead of limiting operation of the vehicle function at step 1035 another embodiment may disable the vehicle function at step 1035 if (a) an operator left lower extremity (60/60A and 62/62A) is not detected at step 1005, and (b) an operator right lower extremity (65/65A and 70/70A) is detected at step 1025, and (c) omitting step 1030; or if (d) an operator left lower extremity (60/60A and 62/62A) is detected at step 1005, (e) an operator right lower extremity (65/65A and 70/70A) is not detected at step 1010, and (f) omitting step 1030.

The other exemplary method also includes disabling the vehicle function at step 1040 if (a) an operator left lower extremity (60/60A and 62/62A) is not detected at step 1005, and (b) an operator right lower extremity (65/65A and 70/70A) is not detected at step 1025.

The foregoing is a detailed description of illustrative embodiments of the invention using specific terms and expressions. Various modifications and additions can be made without departing from the spirit and scope thereof. Therefore, the invention is not limited by the above terms and expressions, and the invention is not limited to the exact construction and operation shown and described. On the contrary, many variations and embodiments are possible and fall within the scope of the invention which is defined only by the claims that follow.

The invention claimed is:

1. An industrial vehicle comprising (i) an operator compartment comprising a floor configured for an operator to stand on, and (ii) an operator presence detector, the operator presence detector comprising:
    a first detector located a distance above the floor and configured to detect an operator's left lower extremity when the left lower extremity is located in the operator compartment;
    a second detector located a distance above the floor and configured to detect an operator's right lower extremity when the right lower extremity is located in the operator compartment;
    wherein the first detector is configured and positioned such that an operator cannot cause the first detector to detect both the left lower extremity and the right lower extremity when the left lower extremity and the right lower extremity are located in the operator compartment; and
    wherein the second detector is configured and positioned such that an operator cannot cause the second detector to detect both the left lower extremity and the right lower extremity when the left lower extremity and the right lower extremity are located in the operator compartment.

2. An industrial vehicle according to claim 1, wherein:
    the first detector is located a distance above the floor in a range of 10 millimeters to 800 millimeters; and
    the second detector is located a distance above the floor in a range of 10 millimeters to 800 millimeters.

3. An industrial vehicle according to claim 1, wherein:
    the first detector and the second detector are horizontally spaced apart no closer than 150 millimeters.

4. An industrial vehicle according to claim 3, wherein:
the first detector and the second detector are vertically spaced apart in a range of 50 millimeters to 800 millimeters.

5. An industrial vehicle according to claim 1, wherein:
the first detector and the second detector are vertically aligned proximate a first side of the operator compartment and a detection field for the first detector diverges from a detection field for the second detector in a direction extending away from the first side of the operator compartment.

6. An industrial vehicle according to claim 5, wherein the detection field for the first detector horizontally diverges from a detection field for the second detector in a direction extending away from the first side of the operator compartment.

7. An industrial vehicle according to claim 6, wherein the detection field for the first detector vertically diverges from a detection field for the second detector in a direction extending away from the first side of the operator compartment.

8. An industrial vehicle according to claim 5, wherein the first detector and the second detector are vertically separated by a distance in the range of 50 millimeters to 800 millimeters.

9. An industrial vehicle according to claim 1, further comprising:
a threshold to the operator compartment; and
a third detector located a distance above the threshold and configured to detect an object above the threshold.

10. An industrial vehicle according to claim 1, further comprising a processor communicating with the first detector and with the second detector, wherein the processor is programmed to:
enable a vehicle function if (a) an operator left lower extremity is detected and (b) an operator right lower extremity is detected.

11. An industrial vehicle according to claim 10, wherein the processor is further programmed to:
limit operation of the vehicle function if only one of an operator left lower extremity and an operator right lower extremity is detected.

12. An industrial vehicle according to claim 10, wherein the processor is further programmed to:
disable operation of the vehicle function if only one of an operator left lower extremity and an operator right lower extremity is detected.

13. An industrial vehicle according to claim 10, wherein the processor is further programmed to:
disable operation of the vehicle function if (a) an operator left lower extremity is not detected and (b) an operator right lower extremity is not detected.

14. An industrial vehicle according to claim 10, further comprising:
a threshold to the operator compartment; and
a third detector located above the threshold and configured to detect an object above the threshold;
wherein the processor is further programmed to:
disable the vehicle function if an object located over the threshold is detected.

15. An industrial vehicle comprising (i) an operator compartment comprising a floor configured for an operator to stand on, and (ii) an operator presence detector, the operator presence detector comprising:
a first detector configured to detect an operator's left lower extremity when the left lower extremity is located in the operator compartment; and
a second detector configured to detect an operator's right lower extremity when the right lower extremity is located in the operator compartment;
wherein at least one of the first detector and the second detector is configured and positioned such that an operator foot contacting the floor cannot be detected by the at least one of the first detector and the second detector.

16. An industrial vehicle according to claim 15, wherein the first detector and the second detector are vertically aligned proximate a first side of the operator compartment and a detection field for the first detector diverges from a detection field for the second detector in a direction extending away from the first side of the operator compartment.

17. An industrial vehicle according to claim 15, wherein:
the first detector is located a distance above the floor and configured to detect an operator's left lower extremity when the left lower extremity is located in the operator compartment;
the second detector is located a distance above the floor and configured to detect an operator's right lower extremity when the right lower extremity is located in the operator compartment;
the first detector is configured and positioned such that an operator cannot cause the first detector to detect both the left lower extremity and the right lower extremity when the left lower extremity and the right lower extremity are located in the operator compartment; and
the second detector is configured and positioned such that an operator cannot cause the second detector to detect both the left lower extremity and the right lower extremity when the left lower extremity and the right lower extremity are located in the operator compartment.

18. An industrial vehicle comprising:
an operator compartment comprising a floor configured for an operator to stand on, the floor having a front side, a left side extending from the front side, a right side extending from the front side and opposite the left side, and a rear side opposite the front side and extending between the left side and the right side; and
an operator presence detector, the operator presence detector comprising:
a first detector located (a) proximate one side of the floor and (b) a distance above the floor, wherein a first detection field associated with the first detector extends between the one side of the floor and the side opposite the one side of the floor; and
a second detector located (a) proximate either (i) the one side of the floor or (ii) proximate the side opposite the one side of the floor and (b) a distance above the floor, wherein a second detection field associated with the second detector extends between the one side of the floor and the side opposite the one side of the floor
wherein the first detector and the second detector are configured and positioned such that an operator who has both a left lower extremity and a right lower extremity located in the operator compartment cannot cause both the first detector and the second detector to detect an object with a single lower extremity.

19. An industrial vehicle according to claim 18, wherein the second detector is located a greater distance above the floor than the first detector.

20. An industrial vehicle according to claim 18, wherein the first detection field is parallel with the second detection field.

21. An industrial vehicle according to claim 18, wherein the first detection field and the second detection field diverge from each other in a direction moving from the one side of the floor towards the side opposite the one side.

22. An industrial vehicle according to claim 18, wherein the first detection field and the second detection field converge towards each other in a direction moving from the one side of the floor towards the side opposite the one side.

23. An industrial vehicle according to claim 18, further comprising a threshold located proximate the rear side of the floor, wherein:
- the first detector comprises a first emitter and a first receiver, wherein one of the first emitter and the first receiver is located proximate the left side of the floor and the other of the first emitter and the first receiver is located proximate the right side of the floor; and
- the second detector comprises a second emitter and a second receiver, wherein one of the second emitter and the second receiver is located proximate the left side of the floor and the other of the second emitter and the second receiver is located proximate the right side of the floor.

24. An industrial vehicle according to claim 23, wherein the first emitter and the first receiver are located a greater distance above the floor than the second emitter and the second receiver.

25. An industrial vehicle according to claim 23, further comprising a third detector comprising one of a third emitter or a third receiver located proximate the left side of the floor, the other of the third emitter and the third receiver located proximate the right side of the floor, and an associated detection field extending over the threshold.

26. An industrial vehicle according to claim 18, further comprising a threshold located proximate the rear side of the floor, wherein:
- the first detector comprises a first emitter and a first receiver, wherein one of the first emitter and the first receiver is located proximate the front side of the floor and the other of the first emitter and the first receiver is located proximate a first side of the threshold;
- the second detector comprises a second emitter and a second receiver, wherein one of the second emitter and the second receiver is located proximate the front side of the floor and the other of the second emitter and the second receiver is located proximate a second side of the threshold;
- the first emitter and the first receiver are located a greater distance above the floor than the second emitter and the second receiver; and
- one of the first emitter and first receiver is vertically aligned with one of the second emitter and second receiver.

27. An industrial vehicle according to claim 26, further comprising a post extending from the floor proximate the first side of the floor, wherein one of the first emitter and the first receiver is located in the post above one of the second emitter and the second receiver which is also located in the post.

28. An industrial vehicle according to claim 26, further comprising a third detector comprising one of a third emitter or a third receiver located proximate the left side of the floor, the other of the third emitter and the third receiver located proximate the right side of the floor, and an associated detection field extending over the threshold.

\* \* \* \* \*